No. 781,496.

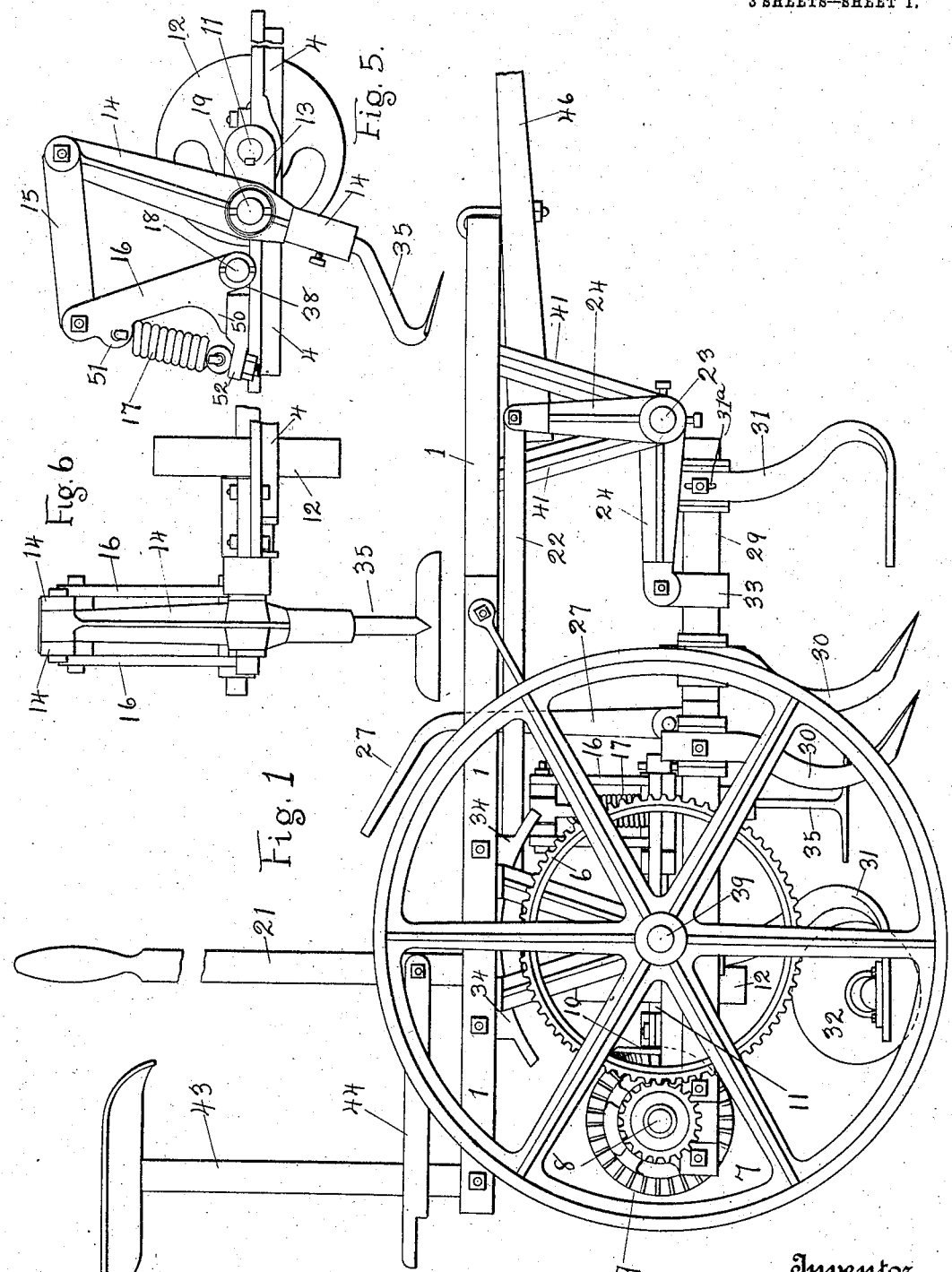

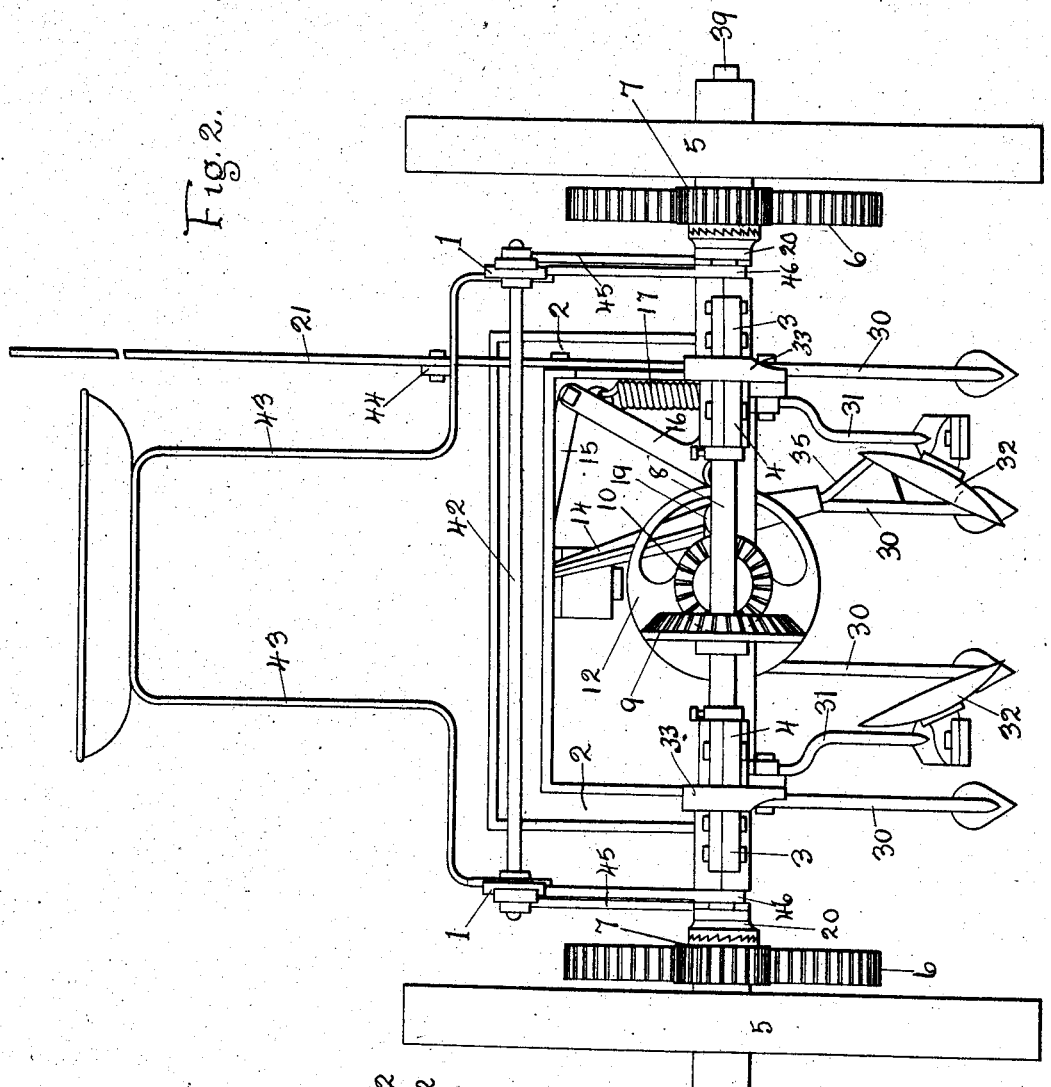

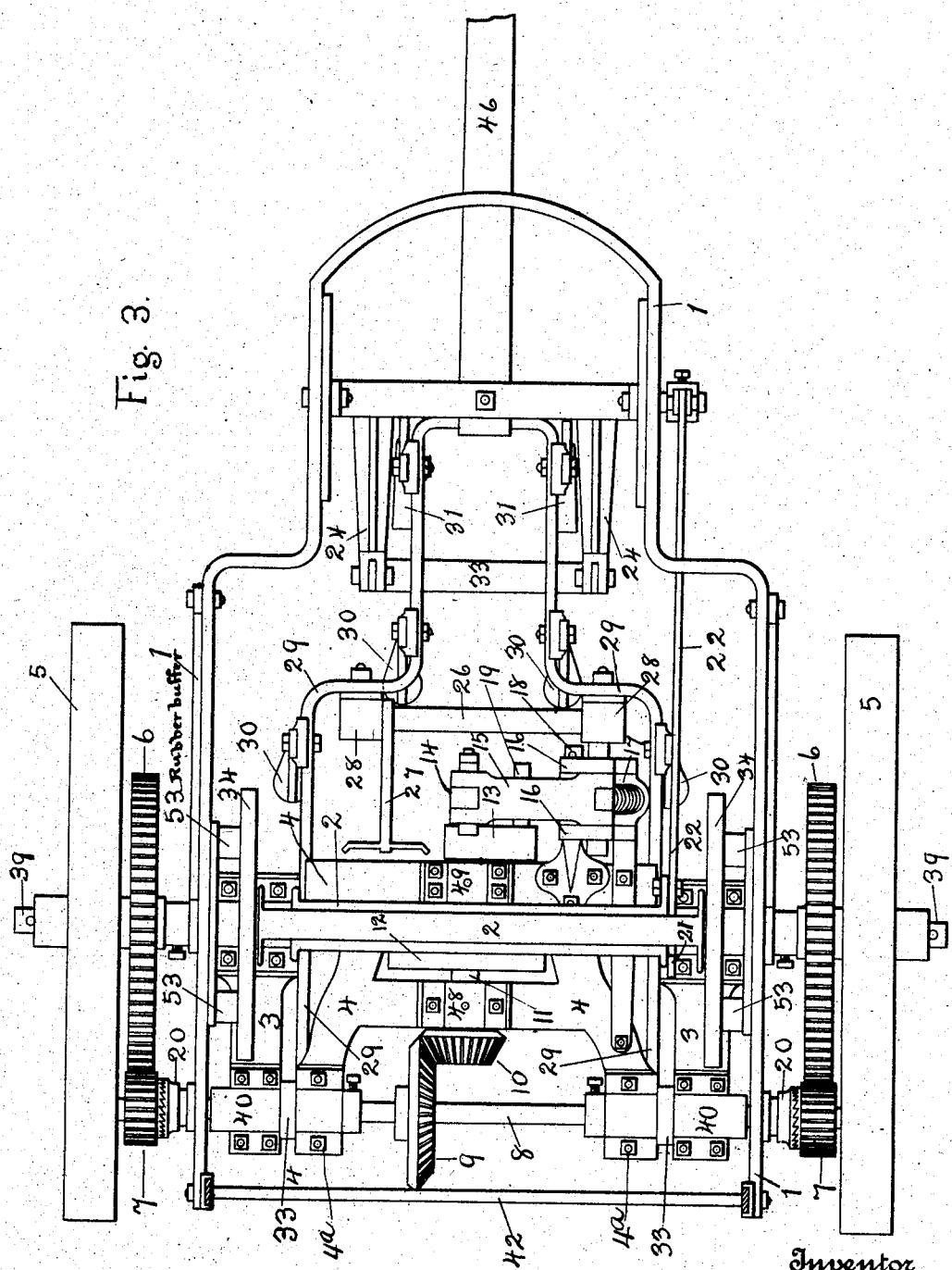

Patented January 31, 1905.

UNITED STATES PATENT OFFICE.

CYRUS W. CRENSHAW, OF ATHENS, ALABAMA, ASSIGNOR OF ONE-HALF TO EDWIN R. RICHARDSON, OF NASHVILLE, TENNESSEE.

COTTON CHOPPER AND CULTIVATOR.

SPECIFICATION forming part of Letters Patent No. 781,496, dated January 31, 1905.

Application filed August 17, 1904. Serial No. 221,103.

*To all whom it may concern:*

Be it known that I, CYRUS W. CRENSHAW, a citizen of the United States, and a resident of Athens, county of Limestone, State of Alabama, have invented certain new and useful Improvements in Cotton Choppers and Cultivators, of which the following is a specification.

My invention relates to cotton choppers and cultivators, more particularly to a machine in which a cotton chopper and cultivator are so combined as to produce an efficient machine for performing the operations of chopping and harrowing cotton, rice, and other like plants by power-driven means.

My object is to provide a machine of this character in which the chopper and the cultivator shall be entirely independent of the transporting-machine or carrying device, so that when the machine is in action any unevenness in the ground over which the wheels are traveling, thus causing a vertical movement of the frame of the carrying device in respect to the plane on which the harrows and choppers are operated, will not affect the harrows or the choppers, which will continue to properly operate without interruption; and my object is, further, to provide a relieving or safety device for the cotton-chopping mechanism whereby hard obstacles—such as clods, stones, and the like—through which the hoes or choppers will not cut, thus tending to damage or break the same, will not in any manner affect the said hoe or chopper, but will permit the same to yield and automatically return to its position after such obstacle is passed; and, finally, my object is to provide a combined chopper and cultivator of the character indicated having a double side harrow and which shall be compact in form and simple and durable in construction.

With these and other objects in view my invention consists in the novel construction of a chopper and cultivator and in the details thereof, as hereinafter described with reference to the accompanying drawings, and more particularly pointed out in the claims.

In the drawings, Figure 1 is a side elevation of the machine embodying my invention. Fig. 2 is an end elevation thereof. Fig. 3 is a top plan view with seat removed. Fig. 4 is a detail, partly in section, hereinafter referred to. Fig. 5 is a side elevation in detail of the safety device, and Fig. 6 is an end elevation thereof.

Referring to the drawings, in which the same or similar reference characters designate the same or corresponding parts in all the views, the numeral 1 indicates the frame of the carrying device or machine, upon which is supported a suitable seat 43 for the driver or operator and from which extends a tongue 46, to which the horses may be harnessed, a tie-rod 42 connecting the sides of said frame at the rear. Supported in hangers 45 and 46 upon this frame is a vertically-arched axle 2, consisting of inner and outer plates connected by a web, forming an I-beam structure, as shown in Figs. 2 and 4, the arched form of said axle providing a space for the operating mechanism of the chopper and also for the raising and lowering of the chopper or harrow frame. Extending horizontally from each side of said arched axle is a short axle 39, forming journals upon which the wheels 5 turn. Mounted upon the axle 39 at the opposite sides of the machine are spur-gears 6, which constitute the main driving-gears of the operating mechanism, such spur-gears meshing with corresponding pinions 7, mounted upon a counter-shaft 8, journaled in suitable bearings 40, carried by arms 3, rigidly attached to the arched axle and extending rearwardly therefrom, as shown in Fig. 4. A bevel-gear 9 is fixed to said counter-shaft 8 and meshes with a corresponding bevel-pinion 10 on a second counter-shaft 11, journaled in two suitable bearings 48 and 49, mounted on the chopper-frame 4, the latter of which is journaled upon the counter-shaft 8 by suitable bearings $4^a$, which allow the frame to swing up and down, whereby the said chopper-frame is mounted so as to be raised and lowered independently of the movements of the carrying-machine, thus permitting the front end of said frame to rise when the machine is passing cotton too thin to chop and also when passing over small obstacles without stopping the motion of the hoe. This counter-shaft 11 is provided with a balance-wheel 12 and a crank-arm or crank-disk 13, from which extends a crank-pin 19, engaging a journal in the chopper-arm 14, in the lower end of which is adjustably mounted the chopper or hoe 35. The upper end of said chopper or hoe arm 14 is connected by the link 15 with what I term a "spring-post" 16, fulcrumed upon a stud or pin 18, attached to the frame 4, which pin supports a journal 38 on said arm. A spring 17 is attached at one end to a lug 52 on said chopper-frame, and the other end engages in a lug 51 or extension of said arm 16 and is constructed to normally hold said chopper-arm 14 in position shown in Fig. 5, where it will be noted that a toe 50 is held in contact with the lug 52 on the frame, thus limiting the position of the arm 16, and consequently restricting to a predetermined position the pivotal point from which the hoe-arm 14 is constrained to vibrate laterally through the medium of a crank 13 on the shaft 11 and the connecting-link 15. The spring 17 is of such tension as to maintain the parts in the position shown during the vibrating movements of the chopper-arm 14 in the ordinary work, but yields to permit the said post 16 to be drawn forward by the arm 14 when the hoe strikes an obstruction through which it will not cut, thereby preventing breakage or damage to the parts, and after the passage of said obstacle the spring will instantly cause the hoe-arm to resume its normal position.

The harrow-frame 29 is, in like manner to the chopper-frame 4, supported independently of the carrying-frame wheels and axle, as it rests on front and rear stirrups 33 and is provided with gage-runners 31, which always slide upon the ground. The front stirrup 33 is carried by two of the arms 24 of a rock-shaft 23, mounted in suitable hangers 41, secured to the main frame 1 of the machine, the other arm 24 of said rock-shaft being connected by a link 22 with an operating-lever 21, fixed to the arched axle and adapted to swing the same backward and forward and from which extends a locking-arm 44, so that a forward motion of said lever thereby vibrating the rock-shaft 23 causes the arms 24 to lift the stirrup 33 upwardly, and thus raise the harrow-frame 29 and the harrows 30 carried thereby above the ground. It will be noted that by this construction the harrow-frame is entirely independent of the carrying device, whereby it is unaffected by the movements of the carrying-machine in passing over rough places and may be raised above ground by forward movement of the lever 21, as above described, in turning or lifting over obstacles, and in the same manner the chopper-frame 4 may be raised by operation of the foot-lever 27, which engages or is connected to a rock-shaft 26, journaled in suitable bearings 28, attached to the harrow-frame 29, so that by a downward movement of said lever 27 the operator can raise the front end of the chopper-frame, which is pivotally supported by its bearings 4ᵃ upon the counter-shaft 8 at the rear, and thus lift the chopper or hoe 35 out of action to clear an obstruction or turn an angle or corner, and this action is not only independent of any movement of the carrying-wheels or device, but also of the movement of the harrow. It will also be further noted that by the operation of the lever 21 the harrow-frame and the chopper-frame may be simultaneously raised to clear the ground for any purpose desired in the operation of the machine, as in turning an angle or corner or clearing any unusual obstruction, if desired. When the harrows and chopper are raised above the ground out of action by the operation of the lever 21, the counter driving-shaft 8 may likewise be released from operative connection with driving-pinions 7 by a movement of the spiral clutches 20 of any approved type and operated by any suitable means.

In order that the harrow-frame may be properly supported and adjusted above the ground independently of the carrying-frame and wheels, the gage-runners 31 are adjustably mounted on the harrow-frame 29, and these runners preferably consist of downwardly-extending arms curved rearwardly, such arms being adjusted to the proper height and secured in place by a bolt passing through a slot 31ᵃ in the said arms and said frame 29, thereby adjustably securing the said gage-runners to the said frame.

In connection with the harrows 30, which, as will be observed, are in pairs on the opposite sides of the machine, I provide covering-disks 32, mounted in suitable bearings—as, for example, upon the gage-runners 31.

It will be observed that in the operation of my machine as the carrying device or truck is hauled or driven forward the double harrows straddle the row and cut furrows on both sides, while the hoe is caused to vibrate through the mechanism described laterally through the said row and at the same time rises and falls vertically, describing an elliptical path, thus effectually performing the operation heretofore ordinarily performed by hand.

As shown in Fig. 2, the lever 21 is attached to the side of the vertical member of the arched axle, so that as the lever is swung forward the arched axle will also swing and raise the arms 3, the counter-shaft carried thereby, and the rear portions of the chopper and harrow frames supported thereon, while the forward portions of the harrow-frame will be lifted through the medium of the link 22, rock-shaft 23, its arm 24, and stirrups 33, and the forward portion of the chopper-frame 4, which overlaps the harrow-frame, as shown in Fig. 3, will be in turn lifted by contact with the harrow-frame, thus simultaneously lifting both harrow and chopper frames, as hereinbefore indicated, the locking-arm 44 being swung down until its notched end engages the seat-support to hold the parts in the raised position.

I claim as my invention—

1. In a combined cultivator and chopper, the combination with the supporting-frame of the machine, of a harrow-frame supported independently with respect thereto, and a chopper-frame similarly supported, so that each may be moved up and down with respect to said supporting-frame, the mechanism for raising and lowering the harrow-frame, mechanism for raising and lowering the chopper-frame with respect to said supporting-frame and connections between the chopper-frame and the harrow-frame whereby the chopper-frame may be raised by the movement of the harrow-frame when desired, as substantially described.

2. In a chopper, the combination with the supporting-frame of the machine, the axle, and the wheels carried thereby, of a counter-shaft journaled in bearings carried by the axle, gearing for transmitting motion from the wheels to the counter-shaft, a chopper-frame pivotally supported upon said counter-shaft, a chopper pivotally supported on said frame, and connections between the counter-shaft and chopper for imparting to the latter a lateral and vertical motion, and cause it to swing laterally and downwardly and forwardly across the row, substantially as described.

3. In a chopper, the combination with a wheeled vehicle, of a chopper-frame carried thereby, the chopper and connections between the wheels of the vehicle, whereby said chopper is vibrated laterally and vertically with respect to the row over which the machine is moving, and a safety-post to which the chopper is pivotally connected, having a spring connection with a fixed part and adapted to yield when the hoe or chopper strikes an obstacle that it will not cut, substantially as described.

4. In a chopper, the combination with a wheeled carrying-frame, of a chopper-frame and connections between the chopper and the wheels of the frame, whereby the chopper is vibrated laterally with respect to the row over which the frame is moving, a post pivotally attached to said chopper-frame, a spring normally holding said post in a predetermined and fixed position, a link pivotally connecting the arm of the chopper with said post, a counter-shaft operated by the wheels, and a crank connection between the counter-shaft and the chopper-arm, substantially as described.

5. In a chopper, the combination with a suitable carrying-frame and wheels therefor, of a chopper-frame supported independently of the carrying-frame, whereby it may be raised and lowered at one end independently of any movement of said frame, a counter-shaft carried by the axle of said frame, a second counter-shaft carried by the chopper-frame, a crank-arm on said latter shaft, the chopper-arm connected with said crank, and adapted to swing laterally of the machine, a post pivotally supported on said chopper-frame and having a yielding connection therewith, and a connection between said post and the upper end of the chopper-arm, substantially as described.

6. In a chopper, the combination with a suitable carrying-frame and wheels thereupon, of an axle having journals for said wheels and carried by the frame, a counter-shaft, gearing between the wheels and said counter-shaft, a chopper-frame journaled to said counter-shaft, a second counter-shaft mounted in bearings on said chopper-frame, gearing connecting the two counter-shafts, the chopper-arm pivotally connected to said chopper-frame, and a spring normally holding said pivotal connection between the arm and the frame in a predetermined position, whereby it may yield to permit the chopper or hoe to pass over obstacles it will not cut through, substantially as described.

7. In a chopper, the combination with a carrying-frame mounted on wheels, and the axle for the wheels carried by the frame, of a transverse counter-shaft, mounted in bearings, attached to the axle, a longitudinal counter-shaft, the chopper-frame journaled on the transverse shaft, a crank on said latter shaft, a spring-controlled post pivotally supported on the frame, a chopper-arm connected to said crank, and a link connecting the post with said arm, substantially as described.

8. In a chopper and cultivator, the combination of a wheeled carrying-frame, of an arched axle having bearings for the wheels, arms attached to said axle, a counter-shaft mounted in said arms, a harrow-frame supported at its rear upon said counter-shaft, a chopper-frame overlapping the harrow-frame and journaled on said counter-shaft and means whereby the arched axle may be moved to adjust the counter-shaft to different heights, and likewise to raise and lower the harrow-frame, substantially as described.

9. In a cultivator, the combination of a wheeled carrying-frame, an axle having rearwardly-extending arms, provided with bearings, with a counter-shaft journaled in such bearings, gearing between the wheels and said counter-shaft, a chopper-frame journaled on said shaft, and supporting at its forward end, independently of the carrying-frame, a chopper-arm pivotally supported on the chopper-frame, and connections between the counter-shaft and arm adapted to vibrate said arm laterally of the machine, and connections, under the control of the operator, for raising and lowering said forward end of the chopper-frame, substantially as described.

10. In a cultivator, the combination of a wheeled carrying-frame, an axle having rearwardly-extending arms provided with bearings, a counter-shaft in said bearings, gearing between the wheels and said shaft, with a chopper-frame journaled on said shaft and supported independently of the carrying-frame, means for operating said chopper-arm, and connections, under the control of the operator, for raising and lowering the forward end of said chopper-frame, substantially as described.

11. In a cultivator, the combination with a wheeled carrying-frame, an axle having rearwardly-extending arms, provided with bearings, a counter-shaft journaled in said bearings, gearing between said shaft and the wheels, a harrow-frame supported at the rear by the counter-shaft, and a stirrup on which the counter-shaft freely rests at its forward end, with means for raising and lowering said harrow-frame, a chopper-frame journaled at its rear on the counter-shaft and having its forward portion overlapping the harrow-frame, substantially as described.

In testimony whereof I have signed my name to this specification in the presence of two subscribing witnesses.

CYRUS W. CRENSHAW.

Witnesses:
 BEN M. SOWELL,
 E. M. BLACKBURN.